United States Patent
Cimecioglu et al.

(10) Patent No.: US 6,540,876 B1
(45) Date of Patent: Apr. 1, 2003

(54) USE OF AMIDE OR IMIDE CO-CATALYSTS FOR NITROXIDE MEDIATED OXIDATION

(75) Inventors: A. Levent Cimecioglu, Princeton; John S. Thomaides, Berkeley Heights; Kraig A. Luczak, Plainsboro; Danielle E. Harkins, Neshanic Station, all of NJ (US)

(73) Assignee: National Starch and Chemical Ivnestment Holding Corporation, New Castle, DE (US)

( * ) Notice: Subject to any disclaimer, the term of this patent is extended or adjusted under 35 U.S.C. 154(b) by 0 days.

(21) Appl. No.: 09/575,303

(22) Filed: May 19, 2000

(51) Int. Cl.[7] .................. D21H 11/20; C08B 15/00
(52) U.S. Cl. ................. 162/177; 162/168.3; 536/56
(58) Field of Search ............... 162/70, 72, 77, 162/78, 91, 157.1, 157.2, 157.4, 157.6, 158, 164.1, 164.6, 166, 168.1, 168.2, 168.3, 168.4, 175, 177; 127/29, 32, 33, 34; 525/54.21, 54.23, 54.24, 54.26; 527/300, 312, 313, 103, 105; 536/45, 105, 102, 56

(56) References Cited

U.S. PATENT DOCUMENTS

| | | | |
|---|---|---|---|
| 3,062,652 A | 11/1962 | Jeffreys et al. ............... 96/99 |
| 3,086,969 A | 4/1963 | Slager ..................... 260/209 |
| 3,297,604 A | 1/1967 | Germino ................... 260/17.4 |
| 3,553,193 A | 1/1971 | LeRoy et al. ............... 260/233.3 |
| 3,632,802 A | 1/1972 | Bemiller et al. ........ 260/233.3 R |
| 3,740,391 A | 6/1973 | Lyman et al. .......... 260/233.3 R |
| 3,807,952 A | * 4/1974 | Lauchenauer ................. 8/186 |
| 4,119,487 A | 10/1978 | Tessler ..................... 162/175 |
| 4,663,448 A | 5/1987 | Chiu ........................ 536/111 |
| 4,675,394 A | 6/1987 | Solarek et al. ............... 536/43 |
| 4,780,339 A | 10/1988 | Lacourse et al. .......... 427/389.7 |
| 5,334,756 A | 8/1994 | Libiki et al. ............... 562/565 |
| 5,504,246 A | 4/1996 | Likibi et al. ............... 562/540 |
| 5,698,688 A | 12/1997 | Smith et al. ................. 536/56 |
| 5,831,043 A | * 11/1998 | Fleche ..................... 536/18.5 |
| 6,069,282 A | * 5/2000 | Fritz-Langhals et al. ..... 568/320 |
| 6,087,135 A | 7/2000 | Kierulff ..................... 435/101 |

FOREIGN PATENT DOCUMENTS

| | | | |
|---|---|---|---|
| DE | 19746805 C1 | 4/1999 | ........... C08B/31/18 |
| EP | 99200536.3 | 2/1999 | ........... C12P/7/24 |
| EP | 99200537.1 | 2/1999 | ........... C08B/15/02 |
| EP | 0 979 826 A | 2/2000 | ........... C07H/3/06 |
| JP | 10-87554 | * 4/1998 | ........ C07C/59/125 |
| WO | WO 95/07303 | 3/1995 | ......... C08B/37/00 |
| WO | WO 96/38484 | 12/1996 | ......... C08B/31/18 |
| WO | WO 97 36052 A | 10/1997 | ......... D21H/21/20 |
| WO | WO 99/23117 | 5/1999 | ......... C08B/15/04 |
| WO | WO 99/23240 | 5/1999 | ......... C12P/19/04 |
| WO | WO 00/50463 | * 2/2000 | ......... C08B/15/02 |
| WO | 199 53590.6 | 3/2000 | ............ D06L/3/06 |

OTHER PUBLICATIONS

Chang et al., Oxidation of Primary Alcohol Groups of Naturally Occuring Polysaccharides with 2,2,6,6-Tetramethyl–Piperidine Oxoammonium Ion, J. Carbohydrate Chemistry, 15(7), 819–830 (1996).*

(List continued on next page.)

Primary Examiner—Steven P. Griffin
Assistant Examiner—Erica Hug
(74) Attorney, Agent, or Firm—Laurelee Duncan, Esq.

(57) ABSTRACT

This invention pertains to the use of compounds containing amide or imide type functional groups to increase the rate of nitroxide mediated oxidation of alcohols, particularly primary and secondary alcohols. While suitable for oxidation of alcohol groups on a variety of substrates, it is particularly useful to oxidize cellulose, cellulose pulp or cellulose fiber such that it is commercially compatible with the traditional paper making process. Such co-catalysts may be used to increase the absolute amount of aldehyde groups on cellulose, cellulose pulp or cellulose fiber, thereby further increasing the inherent wet strength, temporary wet strength, and dry strength of paper made with such cellulose, cellulose pulp or cellulose fiber.

20 Claims, 5 Drawing Sheets

The effect of PAM co-catalyst concentration on carboxyl formation during nitroxide mediated oxidations on softwood pulp (0.5 wt% NaBr owp).

OTHER PUBLICATIONS

J. Bobbitt et al., "Organic Nitrosonium Salts as Oxidants in Organic Chemistry", *Heterocycles*, vol. 27, No.2, 1988, pp. 509–533.

A. de Nooy et al., "Selective Oxidation of Primary Alcohols Mediated by Nitroxyl Radical in Aqueous Solution. Kinetics and Mechanism", *Tetrahedron*, vol. 51, No. 29, 1995, pp. 8023–8032.

Takuya Kitaoka, Akira Isogai, Fumihiko Onabe, *Nordic Pulp and Paper Research Journal vol. 14 No. 4/1999* "Chemical Modification of Pulp Fibers by TEMPO–Mediated Oxidation".

P. Chang et al., "Oxidation of Primary Alcohol Groups of Naturally Occurring Polysaccharides with 2,2,6,6–Tetramethyl–1Piperiding Oxoammonium Ion", *J. Carbohydrate Chemistry*, 15(7), 1996, PP. 819–830.

Isogai A., et al. "Preparation of Polyuronic Acid From Cellulose By Tempo–Mediated Oxidation", Cellulose XX, XX., vol. 5, 1998, pp. 153–164, XP000986859 *abstract*.

U.S patent application Ser. No. 09/454,400, Cimecioglu et al., filed Aug. 1999.

U.S patent application Ser. No. 09/375,931, Cimecioglu et al., filed Aug. 1999.

U.S patent application Ser. No. 09/636,069, Cimecioglu et al., filed Aug. 2000.

U.S patent application Ser. No. 09/375,939, Cimecioglu et al., filed Aug. 1999.

U.S patent application Ser. No. 09/638,319, Cimecioglu et al., filed Aug. 2000.

* cited by examiner

The effect of NaBr on carboxyl formation in the PAM co-catalyzed nitroxide mediated oxidations of softwood pulp (0.20% PAM owp)

The effect of PAM composition on carboxyl formation in nitroxide mediated oxidations of NSK pulp.

The effect of PAM co-catalyst on aldehyde formation during nitroxide mediated oxidations on NSK pulp.

USE OF AMIDE OR IMIDE CO-CATALYSTS FOR NITROXIDE MEDIATED OXIDATION

BACKGROUND OF THE INVENTION

This invention relates to the use of compounds containing amide or imide type functional groups to increase the rate and/or selectivity of the nitroxide mediated oxidation of alcohols, particularly the primary alcohol groups on cellulose, cellulose pulp or cellulose fiber. Aldehyde modified cellulose, cellulose pulp or cellulose fiber prepared by such oxidation is particularly useful in making paper.

The term "paper" as used herein, includes sheet-like masses and molded products made from cellulose, cellulose pulp or cellulose fiber material that may be derived from natural sources. Paper may also be made from synthetic cellulosic fibers and regenerated cellulose as well as recycled waste paper. In addition, paper made from combinations of cellulosic and synthetic materials are applicable herein. Paperboard is included within the broad term "paper".

Papermaking, as it is conventionally known, is the process of introducing an aqueous slurry of pulp or wood cellulosic fibers, which have been beaten or refined to achieve a level of fiber hydration and to which a variety of functional additives can be added, onto a screen or similar device in such a manner that water is removed, thereby forming a sheet of the consolidated fibers, which upon pressing and drying can be processed into dry roll or sheet form. Typically in papermaking, the feed or inlet to a papermaking machine is an aqueous slurry or water suspension of pulp fibers which is provided from what is called the "wet end" system. In the wet end, the pulp along with other additives are mixed in an aqueous slurry and subjected to mechanical and other operations such as beating and refining. Various additives are commonly added to help provide different properties in the paper product.

The preparation of aldehyde containing starches and the use of such aldehyde derivatives in the paper industry as wet and dry strength additives is well known. Both oxidative and non-oxidative methods are known for introducing aldehyde groups into starch. Use of these products in papermaking to provide wet and dry strength properties involves the addition of this separate starch additive component.

The use of nitroxyl radicals and nitrosonium salts in organic chemistry as an oxidative route to produce aldehydes and carboxylic acids from primary and secondary alcohols is disclosed in an article entitled "Organic Nitrosonium Salts As Oxidants in Organic Chemistry" by J. M. Bobbitt and C. L. Flores, in *Heterocycles*, Vol. 27, No. 2, 1988, pp. 509–533. Recently, application of this chemistry was extended to the selective oxidation of primary alcohols in various carbohydrates to carboxylic acids in an article entitled "Selective Oxidation of Primary Alcohols Mediated by Nitroxyl Radical in Aqueous Solution. Kinetics and Mechanism" by A. E. J. de Nooy and A. C. Bessemer, in *Tetrahedron*, Vol. 51, No. 29, 1995, pp. 8023–8032. Patent publication WO 95/07303 dated Mar. 16, 1995 further discloses the use of this technology in which carbohydrates having a primary hydroxyl group are oxidized under aqueous conditions to form products having a high content of greater than 90% carboxyl groups. This art involving the oxidation of primary alcohols generally describes the preparation of polyglucuronic acids with high carboxylic acid content. Similarly, the process of oxidation has been used to prepare various polysaccharides with high carboxyl content as described in "Oxidation of Primary Alcohol Groups of Naturally Occurring Polysaccharides with 2,2,6,6-Tetramethyl-1-piperidine Oxoammonium Ion" by P. S. Chang and J. F. Robyt in *J. Carbohydrate Chemistry*, 15(7), 1996, pp. 819–830. It should be noted that in some applications high carboxylic acid content is undesirable.

Recent patent publications WO 99/23240 and 99/23117, both dated May 14, 1999, respectively disclose methods of oxidizing starch and cellulose using an oxoammonium ion producing reagent in the presence of an enzyme oxidizing agent.

It has recently been discovered that use of selective oxidation with a limited amount of oxidant and a nitroxyl radical mediator under defined reaction conditions provide oxidized cellulose material with effective aldehyde content. Aldehyde modified pulp prepared in this manner contains from 1 to 20 mmoles of aldehyde and 1 to 40 mmole carboxylic acid per 100 grams of cellulose. Such aldehyde modified pulp is used in the production of tissue/towel and other paper products which exhibit unexpected high wet strength, temporary wet strength and dry strength properties and high wet strength/dry strength ratios without the use of other additives.

It would be commercially desirable to improve the rate of nitroxide mediated oxidation of cellulose pulp as slow oxidation rates are disruptive to traditional manufacturing of papermaking and may result in degradation of the cellulose. Surprisingly, it has now been discovered that the use of compounds containing amide or imide type functional groups increases the rate of nitroxide mediated oxidation of alcohols. In particular, such amide or imide compounds increase the rate of nitroxide mediated oxidation of cellulose, cellulose pulp or cellulose fiber, such that it is commercially compatible with the traditional paper making process. In addition, the increased rate of nitroxide mediated oxidation may effectively reduce the occurrence of degradative side reactions. Such co-catalysts may be used to increase the absolute amount of aldehyde groups on cellulose, cellulose pulp or cellulose fiber, thereby further increasing the inherent wet strength, temporary wet strength, and dry strength of paper made with such cellulose, cellulose pulp or cellulose fiber.

SUMMARY OF THE INVENTION

This invention pertains to the use of compounds containing amide or imide type functional groups to increase the rate of nitroxide mediated oxidation of alcohols. While suitable for oxidation of alcohol groups on a variety of substrates, it is particularly useful to oxidize cellulose, cellulose pulp or cellulose fiber so that it is commercially compatible with the traditional paper making process. Such co-catalysts may be used to increase the absolute amount of aldehyde groups on cellulose, cellulose pulp or cellulose fiber, thereby further increasing the inherent wet strength, temporary wet strength, and dry strength of paper made with such cellulose, cellulose pulp or cellulose fiber.

More particularly, this invention pertains to using poly (acrylamide) homo- and/or co-polymers of various compositions and molecular weights to increase the rate of nitroxide mediated oxidation by at least two-fold and to increase the absolute amount of aldehyde groups by up to at least 5%.

This invention further involves the method of preparing paper having wet strength, temporary wet strength and dry strength properties comprising using the cellulose aldehyde pulp prepared by the selective oxidation procedure as described above, as the paper or pulp stock or a component thereof and the resultant paper.

DETAILED DESCRIPTION OF THE INVENTION

Figure 1:
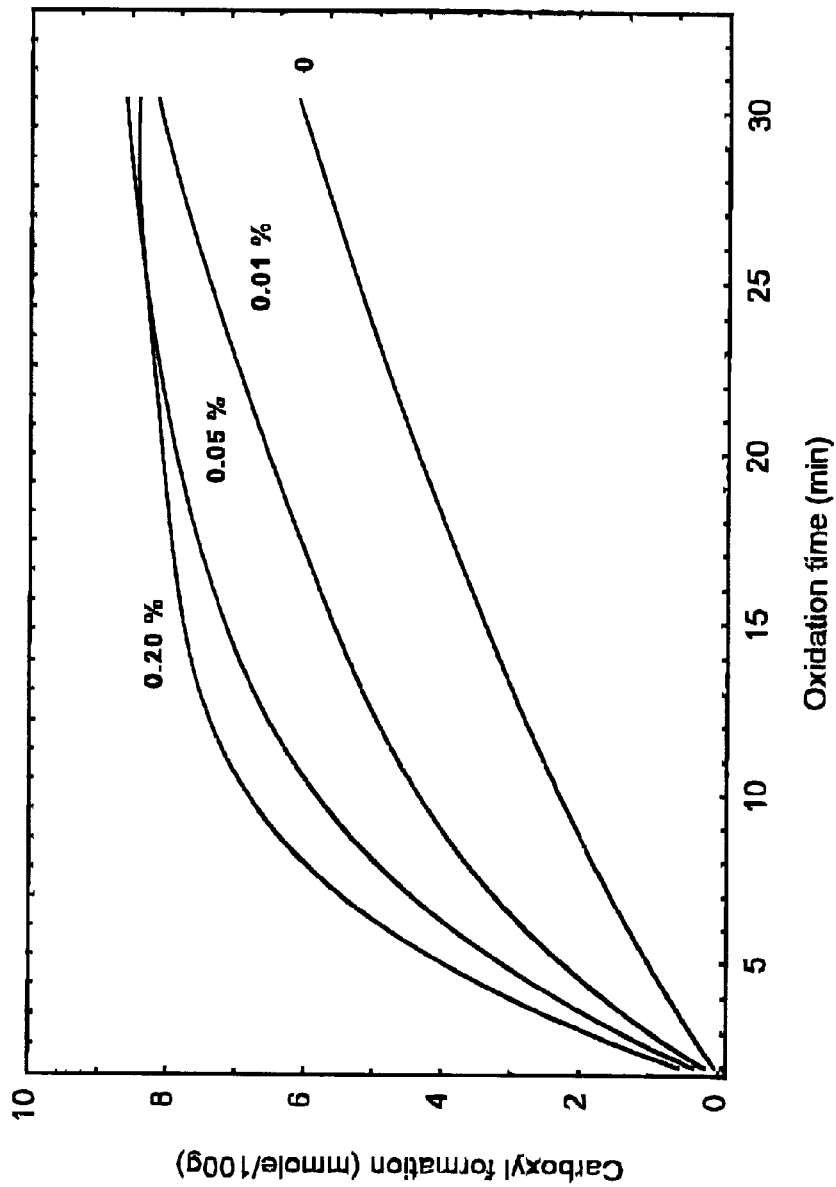
FIG. 1 is a graph showing the effect of PAM co-catalyst concentration on carbonyl formation during nitroxide mediated oxidations on softwood pulp (0.5 wt% NaBr owp).

This invention pertains to the use of compounds containing amide or imide type functional groups to increase the rate of nitroxide mediated oxidation of alcohols. While suitable for oxidation of alcohol groups on a variety of substrates, it is particularly useful to oxidize cellulose, cellulose pulp or cellulose fiber such that it is commercially compatible with the traditional paper making process. Such co-catalysts may be used to increase the absolute amount of aldehyde groups on cellulose, cellulose pulp or cellulose fiber, thereby further increasing the inherent wet strength, temporary wet strength, and dry strength of paper made with such cellulose, cellulose pulp or cellulose fiber.

In this invention, primary or secondary alcohols are oxidized with a suitable oxidant in the presence of a nitroxide radical mediator and a compound containing amide or imide type functional groups. The compound containing amide or imide functionality enhances the rate and/or selectivity of the oxidation reaction. The inventive reaction can be done in a single-phase aqueous or non-aqueous medium or in a bi-phase medium. The reaction temperature is typically 0 to 30° C. In non-aqueous reaction media, primary alcohols are typically oxidized to aldehydes and secondary alcohols to ketones. In aqueous media, primary alcohols can be oxidized to aldehydes or carboxylic acids while secondary alcohols are oxidized to ketones. In aqueous media, the absolute amount of aldehyde formed from primary alcohols in the inventive oxidation reaction and the ratio of aldehyde formed to carboxylic acid formed in the inventive oxidation reaction can be controlled by adjusting the level of oxidant used.

The substrate for the inventive oxidation reaction can be any primary or secondary alcohol. Particularly, the substrate is a carbohydrate or polysaccharide such as a simple sugar, starch, cellulose, gum, or derivatives thereof. More particularly, the substrate is cellulose, cellulose pulp or cellulose fiber. The reaction conditions and co-catalysts used are similar and independent of the substrate used and may be manipulated by one skilled in the art to achieve the desired end product.

The cellulose aldehyde derivatives of this invention can be prepared by a method which involves the selective oxidation of cellulose and cellulose, cellulose pulp or cellulose fiber using a limited amount of oxidant and mediated with a nitroxyl radical and an amide or imide co-catalyst under defined conditions to provide derivatives with effective aldehyde content making them particularly suitable for use in providing paper with desired wet strength, temporary wet strength and dry strength properties.

The nitroxyl radical mediator used herein is a di-tertiary alkyl nitroxyl radical having one of the following formulas:

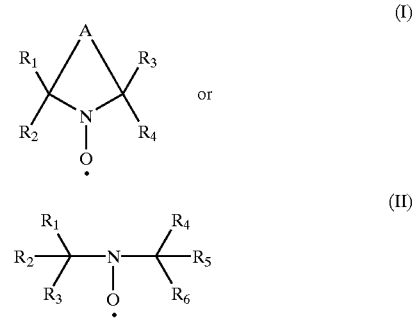

in which A represents a chain of particularly two or three atoms, in particular carbon atoms or a combination of one or two carbon atoms with an oxygen or nitrogen atom, and the R groups represent the same or different alkyl groups. Chain A may be substituted by one or more groups such as alkyl, alkoxy, aryl, aryloxy, amino, amido or oxo groups, or by a divalent group or multivalent group which is bound to one or more other groups having formula I. Particularly useful nitroxyl radicals are di-tertiary alkyl nitroxyl radicals having the formula:

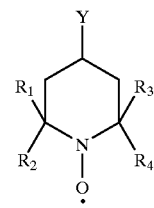

in which Y is either H, OH or NH—C(O)—CH$_3$ and each of the R groups represent the same or different alkyl groups of 1 to 18 carbon atom and more particularly methyl groups. Nitroxyl radicals of this type include those in which a) the R groups are all methyl (or alkyl of 1 carbon atom) and Y is H, i.e., 2,2,6,6-tetramethyl-1-piperdinyloxy (TEMPO); b) R groups are methyl and Y is OH and identified as 4-hydroxy TEMPO; and c) R groups are methyl and Y is NH—C(O)—CH$_3$ and identified as 4-acetamido TEMPO. In particular, the nitroxyl radical is TEMPO or 4-acetamido TEMPO. The nitroxyl radical is used in an effective amount to mediate the oxidation and more particularly from about 0.001 to 20% by weight, particularly from about 0.001 to 0.1% by weight, more particularly from about 0.005 to 0.01% by weight, based on the weight of cellulose, cellulose, cellulose pulp or cellulose fiber. The nitroxyl radical can be added to the reaction mixture or generated in situ from the corresponding hydroxylamine or oxoammonium ion.

The oxidant used in this invention can be any material capable of converting nitroxyl radicals to their corresponding oxoammonium salt. Particularly useful oxidants are the alkali or alkaline-earth metal hypohalite salts such as sodium hypochlorite, lithium hypochlorite, potassium hypochlorite or calcium hypochlorite. An alkali or alkaline earth-metal hypobromite salt may also be used and it may be added in the form of the hypobromite salt itself, such as sodium hypobromite, or it may be formed in situ from the addition of a suitable oxidant such as sodium hypochlorite and an alkali or alkaline-earth metal bromide salt such as sodium bromide. The bromide ion is generally in the form of sodium bromide. Additional oxidants that can be used in this method include hydrogen peroxide in combination with a transition metal catalyst such as methyltrioxorhenium (VII); hydrogen peroxide in combination with an enzyme; oxygen in combination with a transition metal catalyst; oxygen in combination with an enzyme; peroxyacids such as peracetic acid and 3-chloroperoxybenzoic acid; alkali or alkaline-earth metal salts of persulfates such as potassium persulfate and sodium persulfate; alkali or alkaline-earth metal salts of peroxymonosulfates such as potassium peroxymonosulfate; chloramines such as 1,3,5-trichloro-1,3,5-triazine-2,4,6(1H,3H,5H)trione, 1,3-dichloro-1,3,5-triazine -2,4,6(1H,3H,5H) trione sodium salt, 1,3-dichloro-5,5-dimethylhydantoin, 1-bromo-3-chloro-5,5-dimethylhydantoin, and 1-chloro-2,5-pyrrolidinedione; and alkali or alkaline-earth metal salts of ferricyanide. This list of oxidants is only illustrative and is not intended to be exhaustive. The oxidants can be used alone or in combination with an alkali or alkaline-earth metal bromide salt. A particularly suitable oxidant is sodium hypochlorite or sodium hypobromite formed from the addition of sodium hypochlorite and sodium bromide.

When oxidizing cellulose pulp, the oxidant is generally used in a limited amount that has the equivalent oxidizing power of up to 10.0 g of active chlorine per 100 g of cellulose, cellulose pulp or cellulose fiber. The amount of oxidant used may have an equivalent oxidizing power of from about 0.05 to 5.0 g of active chlorine and preferably from about 0.5 to 2.5 g of active chlorine per 100 g of cellulose, cellulose pulp or cellulose fiber. When sodium hypochlorite is used, it typically is used in a limited amount of up to about 10 percent by weight based on the weight of cellulose, cellulose pulp or cellulose fiber, more particularly from about 0.1 to 5% and preferably from about 0.5 to 5% by weight based on the weight of cellulose, cellulose pulp or cellulose fiber. Bromide in the form of sodium bromide will generally be used in an amount of from about 0.1 to 2.5% by weight and preferably from about 0.1 to 1.0% by weight based on the weight of cellulose, cellulose pulp or cellulose fiber. By limiting the amount of oxidant under defined aqueous conditions, the cellulose aldehyde derivatives are selectively prepared at effective high aldehyde levels. Such high aldehyde cellulose products are particularly useful in preparing paper with wet strength, temporary wet strength and dry strength properties.

A co-catalyst is used in the present invention to increase the rate and/or selectivity of the nitroxide mediated oxidation process. The co-catalyst used is at least one compound containing an amide or imide type functionality and may either be a simple or a polymeric additive. Suitable co-catalysts of this invention are amides of carboxylic acids, carbonic acids, carbamic acids, or sulfonic acids, particularly those in which at least one of the substituents of the amide nitrogen is hydrogen or a halogen. Amides of carbonic acid are commonly known as urethanes. Amides of carbamic acid are commonly known as ureas. Exemplary amides include, but are not limited to, acetamide, propionamide, butyramide, isobutyramide, benzamide, nicotinamide, acetanilide, N-methyl acetamide, N-ethyl acetamide, N-methyl propionamide, N-ethyl propionamide, N-methyl butyramide, N-ethyl butyramide, N-methyl isobutyramide, N-ethyl isobutyramide, oxindole, and 2-pyrrolidone. Additional examples of suitable amides include urea, methyl urea, 1,1-dimethyl urea, 1,3-dimethyl urea, 2-imidazolidone (ethyleneurea), urethane (carbamic acid ethyl ester), benzenesulfonamide, toluenesulfonamide, N-chlorobenzenesulfonamide or the alkali, alkaline earth or ammonium salts thereof, and N-chlorotoluenesulfonamide or the alkali, alkaline earth or ammonium salts thereof.

Other suitable co-catalysts of this invention are polymers with amide functionality. The amide functionality may pend from the polymer or be a part of the polymer backbone. Exemplary polymers with pendent amide functionality include but are not limited to poly(acrylamide) and/or copolymers of acrylamide with other ethylenically unsaturated monomers, poly(N-methyl acrylamide), copolymers of N-methyl acrylamide with other ethylenically unsaturated monomers, poly(2-acrylamido-2-methyl propane sulfonic acid), copolymers of 2-acrylamido-2-methyl propane sulfonic acid with other ethylenically unsaturated monomers, poly(3-acrylamidopropyl)trimethyl ammonium chloride), copolymers of 3-acrylamidopropyl)trimethylammonium chloride with other ethylenically unsaturated monomers, poly{[3-(methacryloylamino)propyl]trimethylammonium chloride}, copolymers of [3-(methacryloylamino)propyl]trimethylammonium chloride with other ethylenically unsaturated monomers, poly{[3-(methacryloylamino)propyl] dimethyl(3-sulfopropyl)ammonium hydroxide inner salt}, and copolymers of [3-(methacryloylamino)propyl]dimethyl (3-sulfopropyl)ammonium hydroxide inner salt with other ethylenically unsaturated monomers. Polymers in which the amide functionality is part of the polymer backbone include, but are not limited to, polyamides such as Nylon 6/6, Nylon 6/12, Nylon 6, Nylon 12, polyurethanes, which are typically prepared by the condensation of diols with diisocyanates, polyureas, which are typically prepared by the condensation of diamines with diisocyanates, and poly(urea urethanes), which are typically prepared by the condensation of diisocyanates with mixtures of diols and diamines.

Other suitable co-catalysts are imides in which the substituent of the imide nitrogen is hydrogen or a halogen. Exemplary imides include but are not limited to succinimide, cyanuric acid [1,3,5-triazine-2,4,6(1H,3H,5H) trione] and the alkali, alkaline earth or ammonium salts thereof, 5,5-dimethyl hydantoin, orotic acid, uric acid, saccharin or the alkali, alkaline earth or ammonium salts thereof, imidodisulfuric acid and the alkali, alkaline earth or ammonium salts thereof, and chloramines such as 1,3,5-trichloro-1,3,5-triazine-2,4,6(1H,3H,5H)trione, 1,3-dichloro-1,3,5-triazine -2,4,6(1H,3H,5H)trione sodium salt, 1,3-dichloro-5,5-dimethylhydantoin, 1-bromo-3-chloro-5,5-dimethylhydantoin, N-chlorosuccinimide (1-chloro-2,5-pyrrolidinedione), and N-bromosuccinimide (1-bromo-2,5-pyrrolidinedione).

Other suitable co-catalysts of this invention are polymers with imide functionality. The imide functionality may pend from the polymer or be a part of the polymer backbone. Exemplary imide containing polymers include but are not limited to poly(maleimide) and copolymers of maleimide with other ethylenically unsaturated monomers.

The co-catalysts of this invention can be used alone or with other co-catalysts such as alkali or alkaline-earth metal bromide salts. When they are used in conjunction with alkali or alkaline-earth metal bromide salts, further improvements in the rate of reaction or selectivity of the reaction can be realized than when the co-catalysts of this invention are used alone.

Poly(acrylamide) homo- and co-polymers are particularly suitable. Such poly(acrylamide) polymers are particularly effective due in part to their water solubility, functionality across a broad molecular weight range, and general acceptability in the paper and pulp industry.

The co-catalyst is generally present in a catalyst-effective amount, particularly in an amount of about 0.005 to 5.0%, more particularly in an amount of about 0.01 to 0.5%, most particularly in an amount of about 0.01 to 0.2% by weight based on the weight of the cellulose, cellulose pulp or cellulose fiber.

The cellulose material used as the starting material may be any cellulose, cellulosic fiber or pulp material. This includes hardwood or softwood cellulosic fibers such as bleached and unbleached sulfate (Kraft), bleached and unbleached sulfite, bleached and unbleached soda, neutral sulfite, semi-chemical, groundwood, chemi-groundwood, and any combination of these fibers. In addition, synthetic cellulosic fibers of the viscose rayon or regenerated cellulose type can also be used, as well as recycled waste papers from various sources. The consistency in water of the cellulose or pulp that is used will be from about 0.1 to 15% by weight solids in water and preferably from about 1 to 5% by weight. When used in papermaking other additives such as desired inert fillers or retention aids may be added to the cellulose pulp. Such materials include clay, titanium dioxide, talc, calcium carbonate, calcium sulfate and diatomaceous earth. Rosin or synthetic internal size may also be present, if desired. Other additives commonly used in paper may also be used in combination with the oxidized pulp of this invention.

The oxidation reaction of the cellulosic material is carried out in an aqueous medium. The pH of the reaction is typically about 8.0 to 10.5, particularly about 8.5 to 9.5, the temperature is maintained at from about 5 to 50° C., particularly from about 15 to 30° C. The amount of oxidant used or the reaction time controls the extent of the reaction. Generally the reaction time will be about 1 to 30 minutes, and more particularly about 2 to 15 minutes, most particularly about 5 to 10 minutes. The use of the amide or imide functional co-catalyst will typically increase the rate of reaction by at least about 2-fold, particularly about 4-fold, exhausting the stoichiometric oxidant completely. Generally, the amide or imide functional co-catalyst functions synergistically with the halide co-catalyst in the oxidation process.

By using the reagent and component amounts as defined previously and the noted reaction conditions, controlled amounts of aldehyde functionality, particularly C-6 aldehyde, can be obtained that are suitable and effective in providing desired wet strength, temporary wet strength, and dry strength properties and wet strength/dry strength ratios desired in the final prepared paper product. The cellulose aldehyde derivatives prepared in accordance with this invention will have at least the same aldehyde functionality, particularly greater aldehyde functionality, than when nitroxide mediated oxidation is accomplished without the amide or imide co-catalyst. The aldehyde functionality generated will be from about 1 to 20 mmole/100 g of cellulosic material i.e., cellulose, cellulose pulp or cellulose fiber. Carboxylic acid functionality will also be generated or formed during the oxidation process. Amounts of carboxyl content generated will generally be from about 1 to 40 mmoles/100 g cellulose, cellulose pulp or cellulose fiber. It should be noted that this amount of carboxylic acid functionality is in addition to what may already be present in the cellulose, cellulose pulp, or cellulose fiber naturally or by virtue of the type of processed pulp used, such as bleached sulfate, bleached sulfite, etc. The effective level of aldehyde is an important aspect of this invention and one way this can be defined is by the ratio of aldehyde to generated carboxylic acid functionalities. Such levels can be defined by aldehyde to generated carboxylic acid ratios of greater than or equal to 0.5 (based on mmole/100 g of cellulose, cellulose pulp or cellulose fiber of each functionality) and particularly greater than or equal to 1.0. While recognizing that the amount of additional carboxylic functionality (i.e., other than generated) will vary and may be fairly low, there nevertheless will be some present and this will affect the level of total carboxylic acid functionality. Considering this and based on total carboxylic acid, the ratio of aldehyde to carboxylic acid functionality will be at least about 0.2 to 0.5. The significance of this aldehyde content is particularly manifested in the resulting properties found in paper prepared from the oxidized cellulose material. High wet strength, temporary wet strength and dry strength properties are found. Products having wet strength/dry strength ratios of greater than 20% have been obtained in paper using these selectively modified cellulose aldehyde derivatives indicating improved properties such as softness.

The aldehyde modified cellulose, cellulose fiber or cellulose pulp of this invention can be dried and stored for later use. Paper made from such a stored cellulose, cellulose fiber or cellulose pulp has essentially equivalent properties to paper made directly from the newly prepared aldehyde modified cellulose, cellulose fiber or cellulose pulp of this invention. It is noted that use of the modified aldehyde cellulose derivatives of this invention in papermaking may involve the use of such derivatives as the whole or entire pulp or paper stock or it may be used as a component of the paper stock (i.e., in amounts of 20, 40, 60% by weight etc.).

The following examples will more fully illustrate the embodiments of this invention. In the examples, all parts and percentages are by weight and all temperatures in degrees Celsius unless otherwise noted. Also, when referring to the pulp by weight, it is the weight of the pulp per se, i.e., it includes equilibrium moisture content.

EXAMPLES

Example 1

Nitroxide Mediated Oxidation of Northern Softwood Kraft (NSK) Pulp a. 4-acetamido-TEMPO (4.8 mg) and sodium bromide (0.24 g) [0.01% and 0.5%] on weight of pulp (owp) respectively] were added to a 1600 g stirred suspension of NSK pulp at 3% consistency (48 g pulp). The pH of the mixture was adjusted to 9.5 with 0.49 N sodium hydroxide. Sodium hypochlorite (8.14 g; 11.8% solution; 2% owp), whose pH was also adjusted to 9.5 using concentrated HCl, was then added all at once and the mixture was stirred at 25° C. for 10 minutes. The pH of the suspension was maintained throughout using a Brinkmann pH STAT 718 Titrino at 9.5 with 0.49 N NaOH (2.6 mL). At the end of the treatment period, the reaction was terminated by adding ascorbic acid to the mixture until its pH was lowered to 4.0 to 4.5 range (ca. 1).

The pulp was filtered and washed extensively with water at pH 4–5. It was then re-slurried in water for subsequent use in the determination of its aldehyde content and handsheet making.

b. The pulp was prepared in the same manner as Example 1a, except the pulp was dried and stored for later use instead of being immediately used.

Carboxylic Acid Content of Modified Pulp

The level of carboxylic acid formed during the NSK pulp modification was calculated from the amount of NaOH titrant consumed to maintain the pH of the reaction (2.6 mL of 0.49N solution). This provided a direct measure of the additional carboxylic acid generated on the pulp which was 2.6 mmole/100 g pulp, calculated using the following equation:

$$\text{mmole}/100\text{ g}-\text{COOH} = \frac{\text{mL of NaOH titrant} \times \text{N of NaOH}}{\text{pulp weight in g}} \times 100$$

Determination of Aldehyde Content of the Modified Pulp

Aldehyde content of modified NSK pulp was determined using hydroxylamine hydrochloride titration via oxime derivatization according to the following reaction and the procedure.

$$\text{RCHO} + \text{NH}_2\text{OH.HCl} \rightarrow \text{RCHNOH} + \text{HCl}$$

A sample of the oxidized pulp (ca. 2g) was reconstituted in water (ca. 250mL) and the pH of the suspension was adjusted to 4 using aqueous HCl. To this mixture was then added dropwise a large excess of an aqueous solution of 2 M hydroxylamine hydrochloride solution (3–5 mL), whose pH was also adjusted to 4 with HCl. During the reaction, the pH of the mixture was maintained at 4 via titration with a 0.10 N NaOH solution using a Brinkmann pH STAT 718 Titrino. The titration was continued until no further reduction in pH of the mixture could be detected (ca. 1 h). The pulp was then filtered off and dried to constant weight in an oven at 100° C. Entire procedure was carried out in duplicate. Aldehyde content was then calculated to be 4.7 mmole/100 g pulp from the average total consumption of NaOH (using the following equation:

$$\text{mmole}/100\text{ g}-\text{CHO} = \frac{\text{mL of NaOH titrant} \times \text{N of NaOH}}{\text{dry pulp weight in g}} \times 100$$

Example 2

Nitroxide Mediated Oxidation of Hardwood Pulp a. 4-acetamide-TEMPO (4.8 mg) and sodium bromide (0.24 g) were added to a 1600 g stirred suspension of hardwood pulp at 3% consistency (48 g pulp). The pH of the mixture was adjusted to 9.5 with 0.49 N sodium hydroxide. Sodium hypochlorite (8.14 g; 11.8% solution), whose pH was also adjusted to 9.5 using concentrated HCl, was then added all at once and the mixture was stirred at 25° C. for 10 minutes. The pH of the suspension was maintained throughout using a Brinkmann pH STAT 718 Titrino at 9.5 with 0.49N NaOH, consuming 1.3 mL. At the end of the treatment period, the reaction was terminated by adding ascorbic acid to the mixture until its pH was lowered to 4.0 to 4.5 range (ca. 1 g). The pulp was filtered and washed extensively with water at pH 4–5. It was then re-slurried in water for subsequent use in the determination of its aldehyde content.

The aldehyde and the carboxylic acid contents of the modified hardwood pulp were determined as described in Example 1 and are given in Table 1.

b. The pulp was prepared in the same manner as Example 2a, except the pulp was dried and stored for later use instead of being immediately used.

Example 3

Nitroxide Mediated Oxidation in the Presence of Poly (acrylamide) as a Co-catalyst The identical processes described in Examples 1 and 2 were repeated for NSK and hardwood pulps respectively with the exception that 48 mg poly(acrylamide) (PAM) (0.1% on weight of pulps; average $M_w$=10000 from Aldrich Chemical Co.) was also added to each reaction before NaOCl treatment. The treated pulps were recovered and analyzed as described in Example 1.

Table 1 lists aldehyde and carboxyl functional contents of all modified pulps prepared in Examples 1–3

TABLE 1

The effect of the use poly(acrylamide) on the aldehyde and carboxyl contents of modified pulps.

| | Softwood | | Hardwood | |
|---|---|---|---|---|
| | Aldehyde Content (mmole/ 100 g) | Carboxyl Generated (mmole/ 100 g) | Aldehyde Content (mmole/ 100 g) | Carboxyl Generated (mmole/ 100 g) |
| tandard reactions (Examples 1 & 2) | 4.7 | 2.6 | 4.5 | 1.3 |
| Reactions with PAM (Example 3) | 9.8 | 7.8 | 10.4 | 4.4 |

The results in Table 1 clearly show that the rate of the reactions are significantly increased by the use of a poly (acrylamide) as a co-catalyst as evidenced by substantial increases in both the aldehyde and carboxyl formed in a ten minute period.

Example 4

The Effect of PAM Co-catalyst Concentration in Nitroxide Mediated Oxidation of NSK Pulp The procedure similar to that described in Example 3 was repeated using different amounts of PAM as follows:

In separate reactions, 4-acetamido-TEMPO and sodium bromide (4.8mg and 0.24 g respectively) were added to 1600 g suspensions of NSK pulp (3%) at pH 9.5 containing different levels of poly(acrylamide) (0, 0.01%, 0.05% and 0.20% owp, Mw=10000 form Aldrich Chemical Co.). Sodium hypochlorite (8.14 g; 11.8% solution), whose pH was also adjusted to 9.5 using concentrated HCl, was then introduced all at once and the mixtures were stirred at 25° C. for 30 minutes. The carboxyl formation during oxidation was measured by maintaining the pH at 9.5 throughout using a Brinkmann pH STAT 718 Titrino with 0.49N NaOH. FIG. 1 illustrates the effect of PAM concentration on the carboxyl formation during the oxidations on softwood.

Example 5

The Effect NaBr on PAM Catalyzed Nitroxide Mediated Oxidation of NSK Pulp

Figure 2:
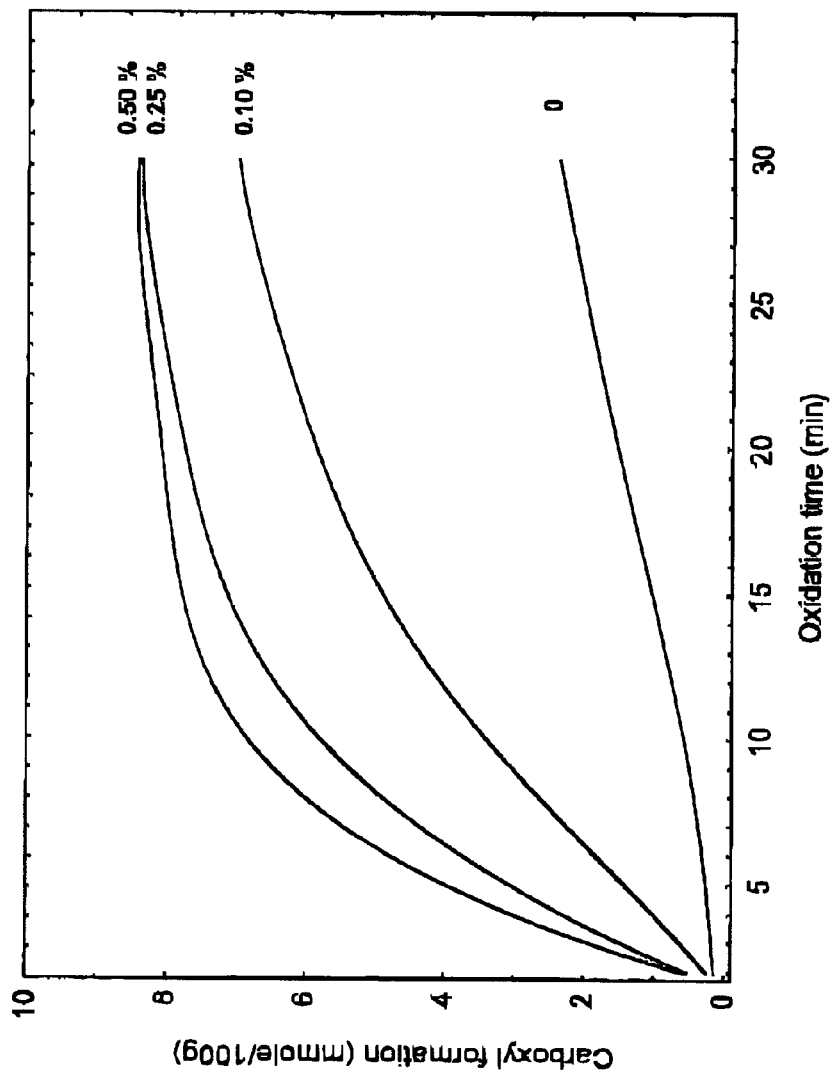
FIG. 2 is a graph showing the effect of NaBr on carboxyl formation in the PAM co-catalyzed nitroxide mediated oxidations of softwood pulp (0.20% PAM owp).

The procedure described in Example 4 was repeated using different amounts of NaBr on the weight of NSK softwood pulp (0, 0.10%, 0.25% and 0.50%) at constant 0.2% PAM owp concentration. The carboxyl formation during oxidation was measured by carboxylate formation during oxidations by maintaining the pH at 9.5 throughout using a Brinkmann pH STAT 718 Titrino with 0.49N NaOH. FIG. 2 illustrates synergistic effect of PAM and NaBr concentrations on the rate formation on the carboxyl groups during the oxidations on softwood.

Example 6

Figure 3:
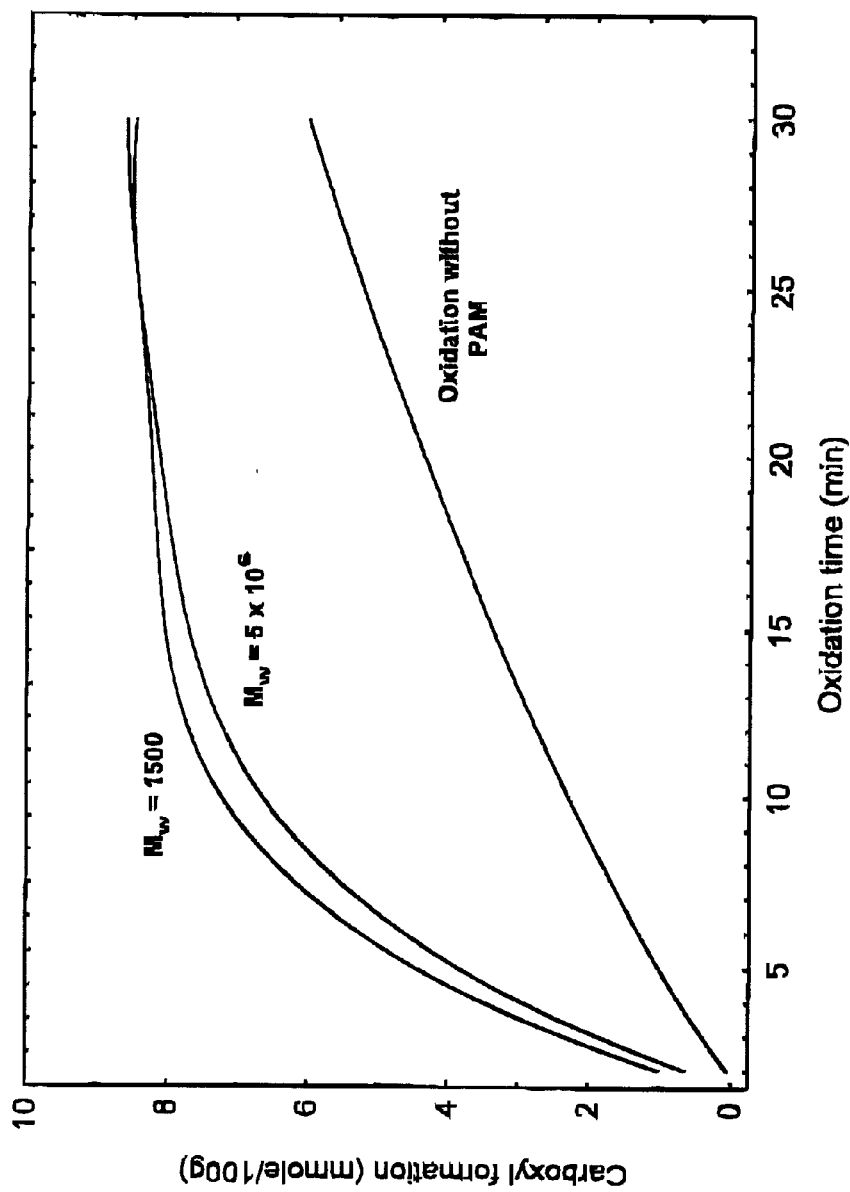
FIG. 3 is a graph showing the effect of PAM molecular weight on carboxyl formation in the nitroxide mediated oxidation of softwood pulp.

The Effect Molecular Weight of PAM on the Nitroxide Mediated Oxidation of NSK Pulp In two separate reactions, the procedure described in Example 4 was repeated using different molecular weight PAM's. Hence, 4-acetamido TEMPO (4.8 mg) and sodium bromide (0.24 g) were added to 1600 g stirred suspensions of NSK pulp at 3% consistency (48 g pulp) containing 96 mg poly(acrylamide) (0.20% owp). PAM molecular weights used were 1500 and 5×10$^6$ supplied by Polysciences Inc. The remainder of the process was as described in Example 4, the carboxyl formation during oxidation being measured by carboxyl formation during oxidations by maintaining the pH at 9.5 throughout. FIG. 3 illustrates the effect of PAM molecular weights on the carboxyl formation during the oxidations on softwood.

Example 7

The Effect PAM Composition on the Nitroxide Mediated Oxidation of NSK Pulp

Figure 4:
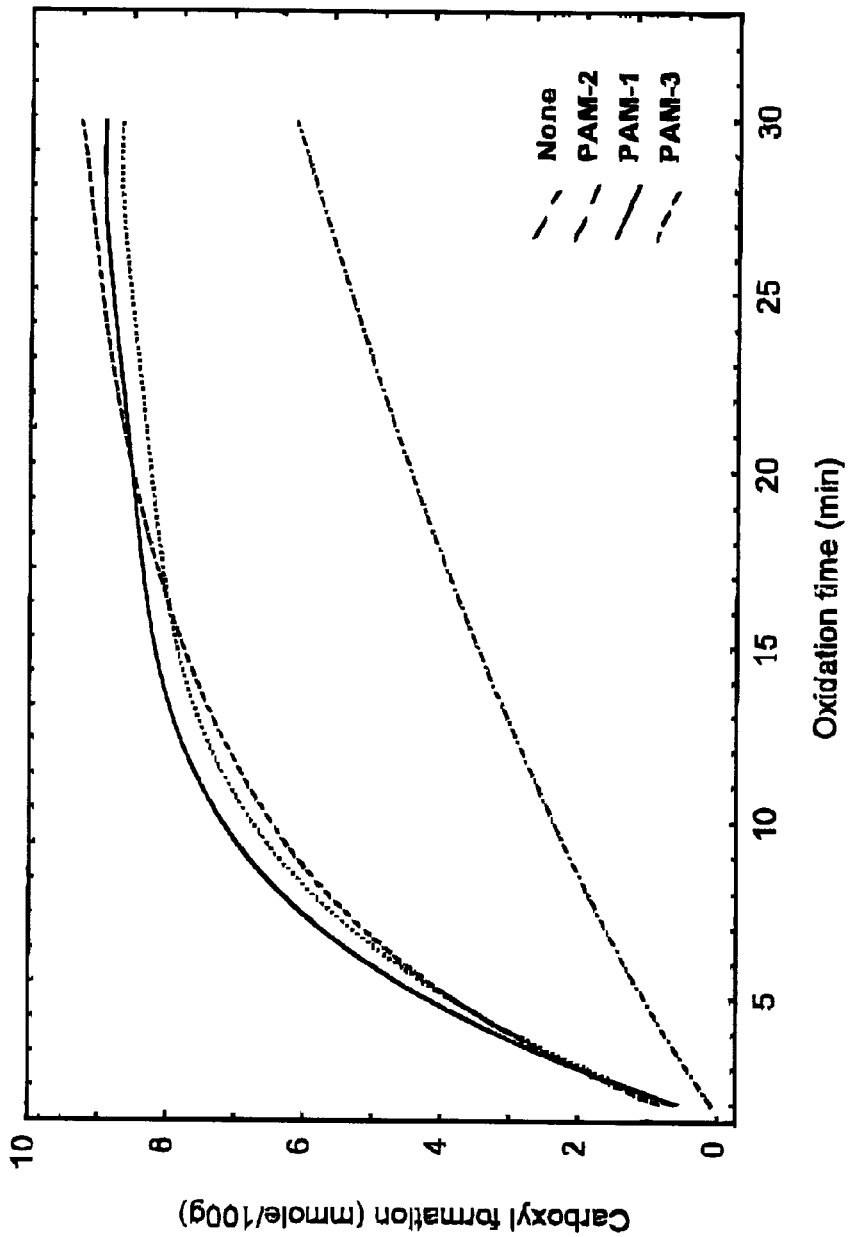
FIG. 4 is a graph showing the effect of PAM composition on carboxyl formation in nitroxide mediated oxidations of NSK pulp.

In several separate reactions, the procedure described in Example 4 was repeated using various homo- and copolymeric PAM compositions at 0.20% concentration on weight of NSK pulp These were poly(acrylamide) ($M_w=1\times10^6$) (PAM-1), poly(acrylamide-co-diallydimethylammonium chloride) from Aldrich Chemical Co. (PAM-2) and poly(acrylamide-co-acrylic acid, sodium salt) ($M_w=0.2\times10^6$) from Polysciences Inc. (PAM-3). FIG. 4 illustrates the effect these on the carboxyl formation during the oxidations on softwood.

Example 8

Figure 5:
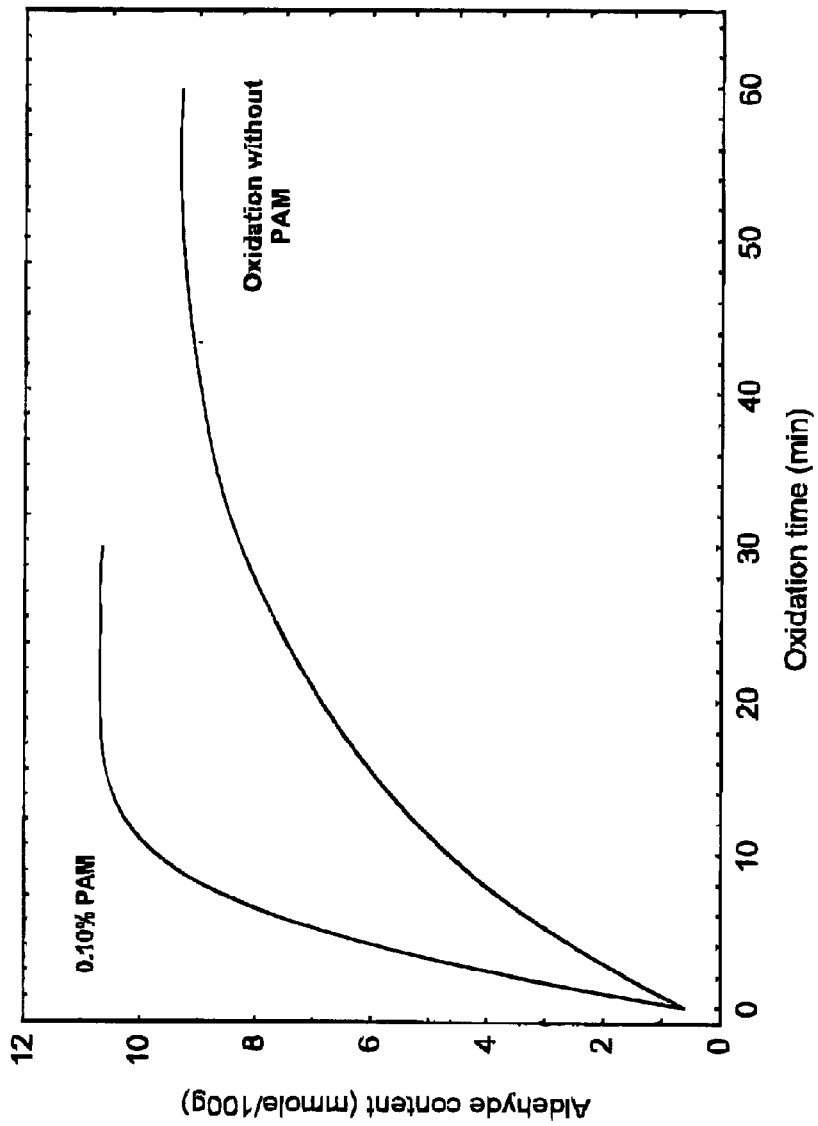
FIG. 5 is a graph showing the effect of PAM co-catalyst on aldehyde formation during nitroxide mediated oxidations on NSK pulp.

The Effect of PAM Co-catalyst on Aldehyde Formation in the Nitroxide Mediated Oxidation of NSK Pulp In two separate reactions, the procedure described in Examples 1 & 4 were repeated on NSK pulp at larger scale with and without a PAM co-catalyst as follows. 4-acetamido-TEMPO (25 mg), sodium bromide (1.24 g) and PAM (0.25 g, Mw=10000 from Aldrich Chemical Co.) were added to suspensions of 248 g NSK pulp in 8L. water at pH 9.5. Sodium hypochlorite (42 g; 11.8% solution), whose pH was previously adjusted to 9.5, was then added all at once and the mixtures were stirred at 25° C. for 30–60 minutes. The pH of the suspensions were maintained throughout using a Brinkmann pH STAT 718 Titrino at 9.5 with 0.98 N NaOH as described in Example 1. Approximately, 150 g aliquots of the mixture were taken form each reaction at regular intervals which were immediately quenched with ascorbic acid. They were then filtered off, washed and reconstituted in water. Aldehyde contents of the modified pulp samples were determined via hydroxylamine hydrochloride titrations as described in Example 1. The effect of PAM co-catalyst on the rate of aldehyde formation with respect to uncatalyzed reaction in FIG. 5.

Example 9

The Effect of Aldehyde Content of NSK Pulp on the Paper Strength Properties

Several aldehyde modified NSK pulp samples of varying functional contents, prepared as described in Example 8, were formed into 18 lb/3300 ft³ handsheets from 0.3% consistency and at pH 5–6 on an M/K Sheet Former according to TAPPI Standard Test Method T 205. Handsheets were conditioned 25° C. and 50% RH for 24 h. They were then were cut into 1" strips and tested for initial wet strength and dry tensile strength at the breaking point according to the TAPPI Standard Test Methods T 456 and 494. Table 2 lists results demonstrating the influence of the aldehyde content of the pulp on the wet and dry strength as well as wet/dry ratio of the handsheets.

TABLE 2

The effect of the aldehyde content of NSK pulp on the handsheet strength properties.

| NSK Aldehyde Content (mmole/100 g) | Paper properties | | |
|---|---|---|---|
| | Wet Tensile Strength (g/in) | Dry Tensile Strength (g/in) | Wet/Dry Ratio (%) |
| Unmodified | 28 | 2171 | 1 |
| 1.9 | 254 | 2333 | 11 |
| 2.3 | 373 | 2354 | 16 |
| 4.1 | 454 | 2259 | 20 |
| 5.4 | 637 | 2239 | 25 |
| 5.9 | 635 | 2396 | 27 |
| 6.9 | 683 | 2341 | 29 |
| 7.4 | 711 | 2515 | 28 |

What is claimed is:

1. A process for the oxidation of substrates containing alcohol groups comprising the step of oxidizing the alcohol groups in a suitable medium with an oxidant in the presence of a nitroxide radical mediator and at least one co-catalyst having functionality selected from the group consisting of amides and imides, wherein the nitroxyl radical mediator is a di-tertiary alkyl nitroxyl radical having a formula of

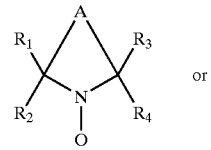

(I)

or

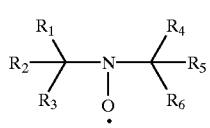

(II)

wherein A is a chain having two or three atoms; each atom is selected from the group consisting of carbon, nitrogen, and oxygen; and $R_1$, $R_2$, $R_3$, $R_4$, $R_5$, and $R_6$ each represent the same or different alkyl groups.

2. The process according to claim 1 wherein the at least one co-catalyst is a poly(acrylamide) or a copolymer of acrylamide.

3. The process according to claim 1 wherein the oxidizing step further comprises a second co-catalyst selected from the group consisting of alkali and alkali metal earth bromides.

4. The process of claim 1 wherein the substrate is selected from the group consisting of a carbohydrate or a polysaccharide.

5. The process of claim 4 wherein the substrate is cellulose, cellulose pulp or cellulose fiber.

6. The process of claim 5 wherein the oxidation of the cellulose, cellulose pulp or cellulose fiber results in an aldehyde content of from about 1 to about 20 mmole/100 g of cellulose.

7. A process according to claim 1 wherein the nitroxyl radical mediator is TEMPO or 4-acetamido TEMPO.

8. The process according to claim 7 wherein the nitroxyl radical mediator is used in an effective amount to mediate the oxidation.

9. The process according to claim 8 wherein the amount of the nitroxyl radical mediator is from about 0.005 to 0.05% by weight, based on the weight of cellulose.

10. The process according to claim 9 wherein the oxidant is an alkali or alkaline-earth metal hypohalite having an oxidizing power of up to 10.0 g active chlorine per 100 g of substrate.

11. The process according to claim 10 wherein the oxidant is sodium hypochlorite or sodium hypobromite.

12. An aldehyde modified cellulose, cellulose pulp or cellulose fiber prepared according to the process of claim 5.

13. A method of making paper having wet strength, temporary wet strength and dry strength properties comprising using the aldehyde modified cellulose, cellulose pulp or cellulose fiber material of claim 12 as the pulp stock or a component of the pulp stock.

14. The paper prepared according to the method of claim 13.

15. The paper of claim 14 wherein the prepared paper has a wet strength to dry strength ratio of at least 20%.

16. A process for the oxidation of cellulose, cellulose fiber and cellulose pulp containing alcohol groups comprising the step of oxidizing the alcohol groups in a suitable medium with about 1–2% sodium hypochlorite in the presence of from about 0.005 to about 0.010 4-acetamido TEMPO, from about 0.1 to about 0.5% sodium bromide, and from about 0.01 to about 0.20% polyacrylamide.

17. An aldehyde modified cellulose, cellulose pulp or cellulose fiber prepared according to the process of claim 16.

18. A method of making paper having wet strength, temporary wet strength and dry strength properties comprising using the aldehyde modified cellulose, cellulose pulp or cellulose fiber material of claim 17 as the pulp stock or a component of the pulp stock.

19. The paper prepared according to the method of claim 18.

20. The paper of claim 19 wherein the prepared paper has a wet strength to dry strength ratio of at least 20%.

* * * * *